(No Model.)
L. MANDL.
PROCESS OF MASHING.
No. 461,684. Patented Oct. 20, 1891.
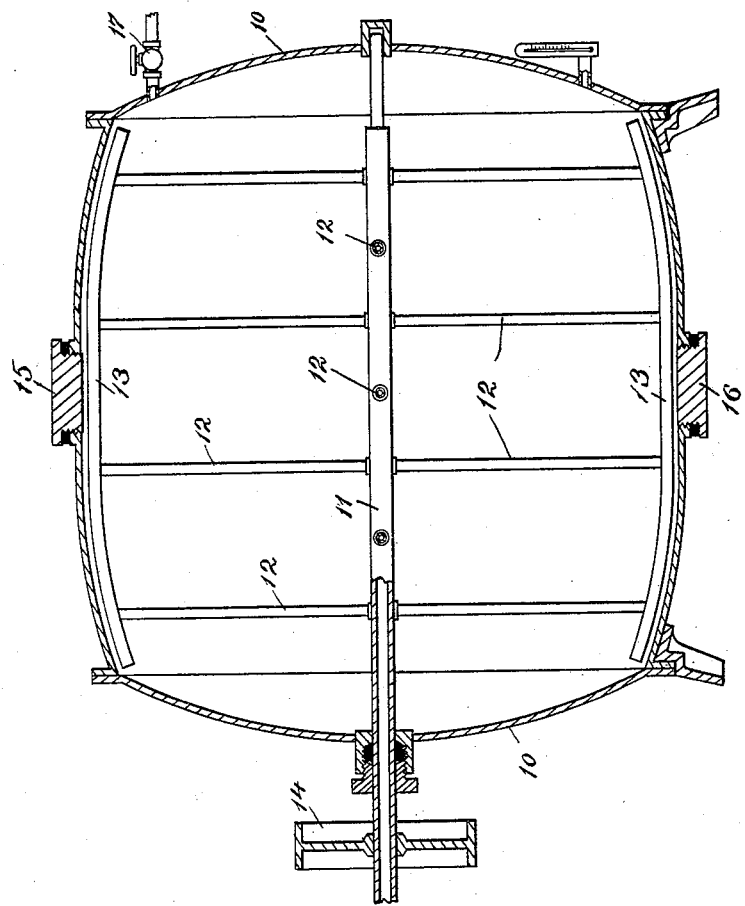
WITNESSES:
INVENTOR
Leopold Mandl
BY
Edward Kent Jr
ATTORNEY.

UNITED STATES PATENT OFFICE.

LEOPOLD MANDL, OF BUDA-PESTH, AUSTRIA-HUNGARY.

PROCESS OF MASHING.

SPECIFICATION forming part of Letters Patent No. 461,684, dated October 20, 1891.

Application filed December 5, 1890. Serial No. 373,634. (No model.)

*To all whom it may concern:*

Be it known that I, LEOPOLD MANDL, a subject of the Emperor of Austria, residing at Buda-Pesth, Austria-Hungary, have invented a new and useful Process of Manufacturing Alcohol and Alcohol and Compressed Yeast, of which the following is a specification.

My invention relates to the manufacture of a mash to be used in the production of either alcohol or compressed yeast, or both, the main object of the invention being to avoid the necessity of raising the mixture from which the mash is made above the boiling-point; and to the end named the invention consists, essentially, of a process of mashing wherein the raw material is placed in a body of water and then raised to the boiling-point while in free communication with the atmosphere. After this boiling has been continued a sufficient time to bring the material to the required condition the boiling is discontinued, and the mash is then subjected to a high air-pressure, all as will be hereinafter fully explained, and specifically pointed out in the claims.

In the drawing which accompanies and forms part of this specification I have represented in central sectional elevation an apparatus by means of which my improved process may be carried into practice.

In the drawing above referred to, 10 represents a digester, in which there is mounted a hollow shaft 11, having hollow agitator-arms 12, that are by preference arranged in sets, the arms of each set being connected by a pipe or tube 13, that conforms to the inner peripheric face of the digester. The shaft 11 is fitted for connection with a steam-generator and provided with a pulley 14, adapted to receive a driving-belt. The digester is furnished with receiving and discharging openings that are at times closed by plugs or covers 15 and 16, as shown.

In carrying out my process the necessary quantity of water is first placed within the digester, and then the raw material is introduced. Steam is then admitted to the hollow shaft 11 and such shaft revolved, the plug or cover 15 being at this time removed. After the mash has been sufficiently steeped the plug or cover 15 is applied, as represented, and the mass is subjected to a heavy air-pressure, the compressed air being forced in through the pipe 17, that is connected with any proper air-compressing mechanism, the pressure applied being, by preference, equal to that of four or five atmospheres. During the continuance of this heavy pressure the temperature is held at about 100° centigrade through the action of steam that is admitted to the shaft 11 and its connections.

Instead of the apparatus above described I may make use of any of the well-known closed high-pressure mash apparatus, such as the Hentze, Hollefreund, or Bohm, in which the farinaceous raw materials, such as potatoes, corn, rye, barley, &c., are cooked. In these apparatus the required quantity of water for steaming and cooking is introduced in the apparatus first, and afterward the raw material to be mashed is placed in the water within the apparatus. In the Hentze apparatus the raw material is introduced in its natural condition, and in the Hollefreund and Bohm apparatus and others of similar type, in which the mashing is performed under a high steam-pressure, the raw material is introduced into the water either in the natural or in a crushed condition.

The operation is begun by admitting steam into the mash-tub, and this is kept up until all the amylaceous flour of the raw material has been thoroughly steeped. It is to be noted that as long as the mash is being steamed the man-holes of the apparatus or the channels through which the generated steam escapes should be left open in order to prevent the temperature of the mash rising above the boiling-point or above 100° Celsius, (centigrade.) It is further to be noted that when the apparatus of Hollefreund and Bohm and others of the same type are made use of it is necessary to keep the stirrers with which such apparatus are provided constantly in motion during the entire process of mashing, and such stirrers should be so constructed as to make the required number of revolutions. After the mash has been sufficiently steamed no more steam should be admitted and the man-holes and channels should be closed. At this point in the process I admit atmospheric air into the empty upper part of the apparatus from a compressed-air accumulator, or the compressed air may be supplied by means of an air-pump directly until the manometer on the apparatus indicates a pressure of from four (4) to five (5) atmospheres. This pressure must be constantly kept up when making use of the Hentze apparatus for two to three hours, and when using the Hollefreund and Bohm apparatus and those of similar construction for from three (3) to four (4) hours, during which period the mash has to be stirred without interruption by means of the usual stirrers connected with such apparatus. The process of mashing is now deemed finished when carried out in the Hollefreund and Bohm apparatus and similarly-constructed apparatus. In the Hentze apparatus, however, the mash should be kept for two (2) or three (3) hours under a constant pressure of four (4) or five (5) atmospheres, after which it is blown off by means of a disintegrating-machine—as, for example, a disintegrator or a mash-mill of the Bohm system—into a mashing apparatus of the Hollefreund or Bohm system, in which the stirrers are to be kept constantly in motion. As soon as the mash is entirely blown off into one of the above-mentioned apparatus it is again exposed in said apparatus to a high air-pressure of four (4) to five (5) atmospheres for two hours, during which time the stirrers are kept rotating. This will finish the process of mashing when making use of the Hentze apparatus. The next step in the proceeding, or the saccharizing by adding the required quantity of malt, is the same as heretofore practiced.

It is observed that it is absolutely necessary to keep the mash at a boiling temperature (100° centigrade) to obtain a satisfactory result. This is essential in carrying out the process in any of the above-mentioned apparatus, and it can be done by admitting the necessary amount of steam during the time that the mash is under a high air-pressure or by heating the air that is used to create the high pressure to a temperature of about 110° centigrade before it is admitted into the mashing apparatus, thus preventing the mash from cooling off.

When the high pressure is obtained by means of air instead of steam, there will be a considerable saving of fuel. This is apparent, since in the first place the entire amount of steam under a pressure of about four (4) atmospheres which fills the apparatus is lost in the atmosphere when the boiling mash is blown off, and in the second place there is considerably less steam required in practicing my process, and finally there is no condensing of steam in my process, thus effecting a large saving of steam.

The high steam-pressure required in practicing the well-known processes of mashing necessitates the raising of the temperature to about 40° centigrade above the boiling-point, which results in not only converting the amylaceous flour into caramel, but also nearly totally decomposes the different saccharine portions, such as dextrine, which, according to Prof. Maerker's *Manual for the Manufacture of Alcohol,* is about five per cent. in potatoes and in corn about sixteen per cent. The effect of this is to make those portions incapable of alcoholic fermentation, and they are thus entirely lost for producing alcohol or compressed yeast.

When air-pressure is used instead of steam-pressure, as proposed by me, there will be no rising of the temperature, thus almost entirely preventing the conversion of the amylaceous flour into caramel, and as a further consequence of the temperature remaining stationary there will be scarcely any decomposition of the saccharine and dextrine-like portions found in the various kinds of grain, and hence such components will be available for producing alcohol and compressed yeast. High temperature, producing decomposition, causes contingent fermentations, which are detrimental to the alcoholic fermentation, and hence there results a loss of products. It will be apparent that by my process there will be a better and more abundant extraction of the raw material, and consequently a larger yield of alcohol and compressed yeast.

My new process permits the use of whole grain in all mashing apparatus constructed to be used with high pressure, and is therefore applicable in the manufacture of compressed yeast. The use of whole grain avoids the hitherto necessary crushing of the grain, besides resulting in an increased yield of compressed yeast.

In my process I entirely do away with the necessity of raising the temperature of the water considerably above the boiling-point, which is unavoidable in the high steam-pressure processes now commonly practiced. The temperature of the mash in my process will always be about 100° centigrade, which will naturally result in obtaining a good, wholesome, and nicely-colored compressed yeast that will possess qualities which will enable it to be kept in a good state a long time. The high air-pressure of my process will also cause a better, larger, and more complete infusion, and therefore the yield of yeast and alcohol will be of better quality and of increased proportions.

It will be understood, of course, that by my new process I can produce either alcohol alone or alcohol and yeast at the same time. To produce alcohol and good yeast at the same time is not possible by the use of the commonly-practiced processes on account of the high temperature of the mash. Furthermore, the development of injurious products, due to contingent fermentations, is avoided in my process through the perfect infusion of the mash during the fermentation, and thus a much purer raw alcohol will result than can be obtained by the usually-practiced processes.

Having thus described my invention, what I claim as new, and desire to secure by Letters Patent of the United States, is—

1. The herein-described process of mashing, which consists in subjecting the raw material and water to the action of heat, and thereby raising the temperature of the mash not above 100° centigrade, in then cutting off the heat and bringing in contact with the mash air under high pressure, maintaining this pressure for a desired time, and stirring the mash while subjected to the action of the heat and air.

2. The herein-described process of mashing, which consists in introducing the raw material into a body of water, subjecting the mixture to the action of steam, thereby raising the temperature of the mash not above 100° centigrade, discontinuing the steam-supply, bringing in contact with the mash air under high pressure, maintaining this pressure for a desired time, and stirring the mash while subjected to the action of steam and air.

In witness whereof I have hereunto signed my name in the presence of two subscribing witnesses.

LEOPOLD MANDL.

Witnesses:
   WEISS, ADOLPH,
   STROMSZKY, ALEXANDER.